No. 680,619. Patented Aug. 13, 1901.
C. RICHTER & R. T. ESCHLER.
ELECTRIC TRACTION MOTOR.
(Application filed Jan. 15, 1901.)

(No Model.) 2 Sheets—Sheet 1.

WITNESSES:

INVENTORS
Charles Richter.
Richard T. Eschler.
BY
ATTORNEYS

No. 680,619. Patented Aug. 13, 1901.
C. RICHTER & R. T. ESCHLER.
ELECTRIC TRACTION MOTOR.
(Application filed Jan. 15, 1901.)
(No Model.) 2 Sheets—Sheet 2.

WITNESSES:
M. S. Blondel
Edw. W. Byrn.

INVENTORS
Charles Richter.
Richard T. Eschler.
BY Munn & Co.
ATTORNEYS

UNITED STATES PATENT OFFICE.

CHARLES RICHTER AND RICHARD T. ESCHLER, OF CAMDEN, NEW JERSEY.

ELECTRIC TRACTION-MOTOR.

SPECIFICATION forming part of Letters Patent No. 680,619, dated August 13, 1901.

Application filed January 15, 1901. Serial No. 43,299. (No model.)

*To all whom it may concern:*

Be it known that we, CHARLES RICHTER and RICHARD T. ESCHLER, of Camden, in the county of Camden and State of New Jersey, have invented a new and useful Improvement in Electric Traction-Motors, of which the following is a specification.

Our invention is in the nature of certain improvements upon the electric traction-motor for which Letters Patent No. 643,276 were granted us February 13, 1900. In that motor the car-wheel itself was organized so as to form the motor-case, the field-magnets being fixed and held stationary upon the axle, while the armature was constructed as a peripheral ring near the outer circle of the car-wheel and was fixed to and revolved with the car-wheel, a suitable commutator being fixed on one of the inner plates of the car-wheel, which coöperated with brushes fixed in the hub portion of the field-magnet. In this construction the gap between the field-magnets and armature is located as near as possible to the outer periphery of the wheel, where the speed and leverage is greatest and the torque of a direct-current motor is best able to give effective results.

Our present improvement consists in the special construction of the wheel-plates and tire forming the motor-case, in the peculiar construction and arrangement of roller-bearings for sustaining and concentrically holding the axle and field-magnets, in the means for providing for the end thrust of the independently-rotating wheel in the direction of its axis, and in the means for cushioning or holding the axle and attached field-magnets with an elastic action against the torque, as will be hereinafter more fully described with reference to the drawings, in which—

Figure 1:
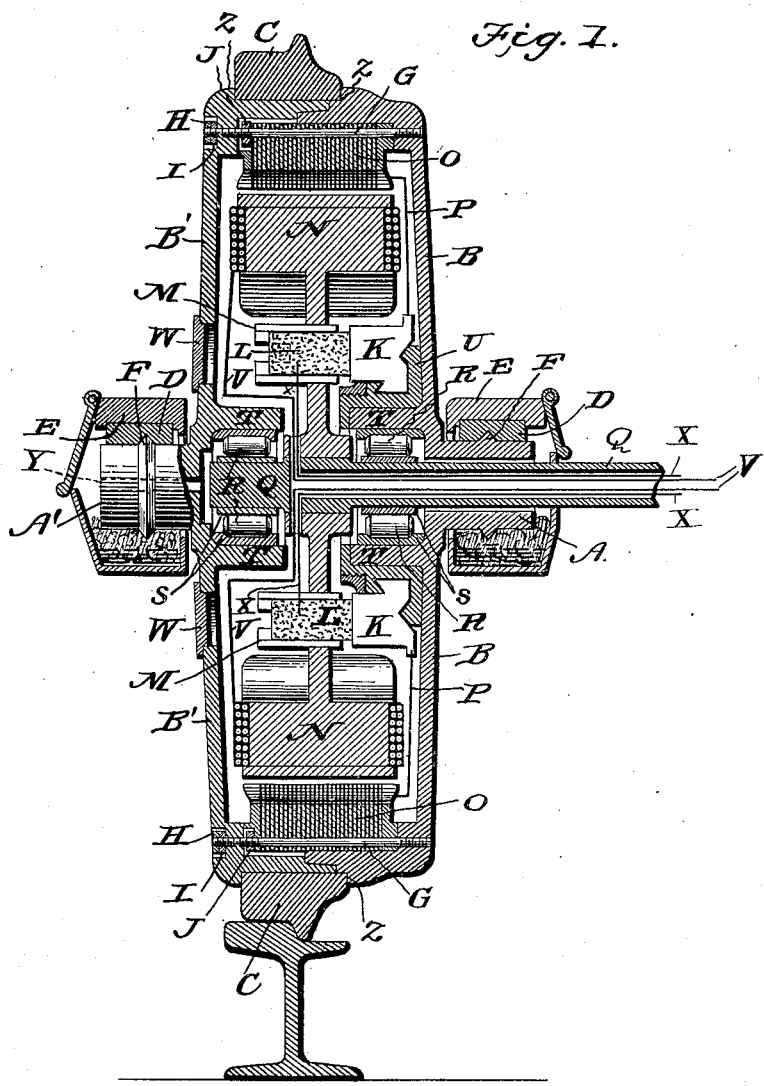
Figure 2:
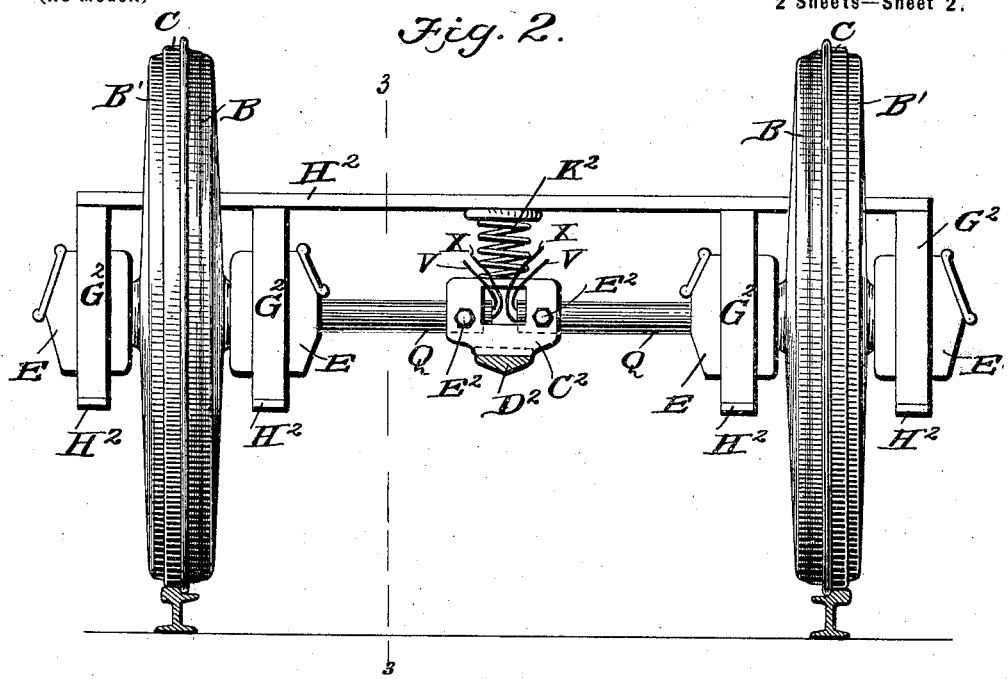
Figure 3:
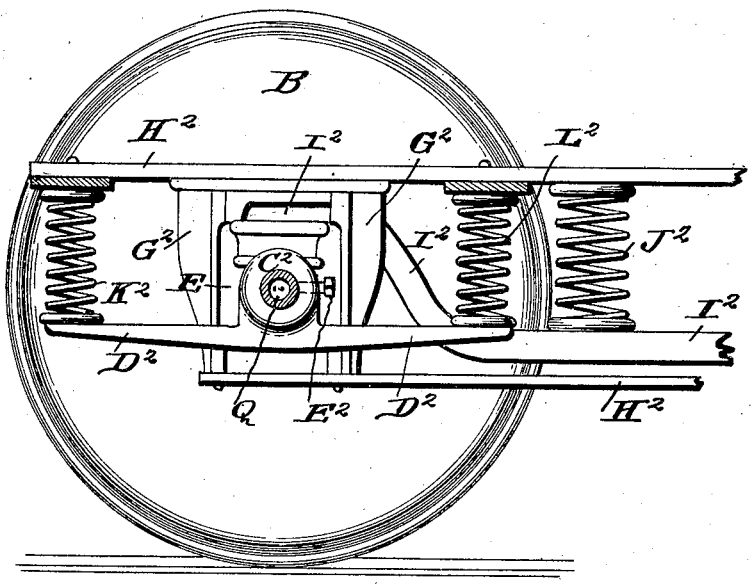

Figure 1 is a vertical central section through one of the motor-wheels. Fig. 2 is an edge view, on a smaller scale, of a pair of such wheels looking at right angles to their axles and with arm $D^2$ in section; and Fig. 3 is a section on line 3 3 of Fig. 2.

We will first describe the internal construction of the motor-wheel, referring especially to Fig. 1.

A and A' designate hollow hubs or bearings, which are in one piece, respectively, with the steel shells or webs B and B', which latter are bolted together and form the hollow wheel.

C is a steel tire shrunk to shell B'. Shell B' has no electrical parts connected with it, and when it becomes necessary to renew the tire it can be done without fear of injuring the electrical parts. Shells B and B' are formed with shoulder projections Z Z for the purpose of clamping and retaining the tire in its place. The joint between the shells comes under the tire and is of zig-zag form, so as to lock them together and also make the joint water-tight, for which purpose a gasket may be used between any two surfaces forming the lock-joint.

D designates the bearing-boxes or brasses, in which the hubs A and A' rotate.

E E are the containing-boxes for the brasses or bearings, which are connected with the truck of the car in the usual way and are provided with the usual means of lubrication for the hubs A and A'.

F F are rigid collars on the hubs entering grooves in the brasses, which may be constructed in different ways and are for the purpose of effectually taking care of the side thrust of the wheel when rounding curves and to maintain the gage or distance between the wheels. We prefer to locate these thrust-surfaces within the boxes rather than outside of the same on account of the more efficient and economical lubrication.

G G are bolts which are screwed into shell B and provide means by the use of nuts J J to rigidly connect the armature-plates O of the motor to the said shell B. These same bolts G G are used to hold the shells B and B' together by means of nuts and check-nuts I and H, respectively.

K K is the commutator, mounted solidly on shell B, as will be explained later.

L L are carbon brushes sliding in brush-holders M M and held against the face of commutator K by spring-pressure.

N N represent the field-magnet of the motor, which is of the multipolar type. It is supported on a stationary axle Q, which has the sole function of supporting the field-magnet, no other load being brought to bear on it.

O is the armature of the motor, which is made of annular plates, with inwardly-projecting cores drum-wound for the purpose of allowing its outside surface to be in metallic contact with the metal of the shells B B', which makes the entire outside surface of the wheel a radiating surface to carry off the heat developed in the running of the motor. The armature O is rigidly connected with shell B, as explained before, by means of the bolts G G and rotates with the wheel.

P P are conductors connecting the armature-windings with the commutator K.

The shells B and B' are also provided with annular hubs T T on the inside. On the inside of these hubs T T and on the outside of the stationary axle or field-carrier Q hardened-steel sleeves S S are provided, which form the bearing-surface for rollers R R. This roller-bearing has only to support the weight of the field-magnet. Consequently the wear on the same will be negligible. It will further keep the clearance or gap between the armature and field-magnet constant.

The stationary axle or field-carrier Q has a hole bored through part of its length and also one at right angles, which intersects the first one. The hub of the field-magnet where it is fastened onto the carrier Q is also bored with holes. These holes are for the purpose of carrying the connecting wires X X V V from the brush-holders and field-windings, respectively, to the outside of the wheel.

U is a shell upon which the commutator K is assembled. This shell U slips over and is securely fastened to the outside of the annular hub T.

W W are hand-holes provided with suitable water-tight covers, by means of which easy access can be had to the brushes.

Y is an oil-hole in the hub A' for the roller-bearing.

As will be seen in the drawings, the stationary axle or field-carrier Q goes through the hub A, which is provided with a hole of somewhat-larger diameter than the field-carrier Q. The space between A and Q will answer as an oil-hole for the other roller-bearing. The retaining lips or shoulders Z Z on the shells B B' are for the purpose of holding the tire from working loose sidewise.

From the above description it will be seen that the wheel is entirely inclosed, making the same dust and water proof; further, that the wheel rotates in separate bearings, which are provided with thrust-surfaces to take care of the end thrust when rounding curves and to maintain the distance between the wheels. This construction makes each wheel independent from the other and in turning curves allows it to attain a different velocity from its mate, and thereby all friction, slipping, and grinding that takes place with the present car-wheels when rounding curves is avoided. As there is a bearing on each side of the wheel and the load is brought to bear on them equally by means of the usual arrangement of springs, it can easily be seen that the wheels must be kept straight and in perfect alinement. It is further seen that no part of the load comes on the stationary axle or field-carrier Q, which only supports the field-magnet.

We will now describe the means for holding the axle and the field-magnet in an elastic manner against the torque. A stationary axle or field-carrier in this type of motor must be held securely against the torque of the armature of the motor in order to give rotation to the wheel; but in order to prevent the heavy strain incident to the starting of the motor we allow the axle or field-carrier to turn through a small angle and limit this movement and at the same time provide a cushion by the use of springs. In starting the motor the axle or field-carrier will turn through a small angle and compress the springs until the torque of the armature is counterbalanced by the compression of the springs.

Referring now to Figs. 2 and 3, Q represents the stationary axles or field-carriers, and B B' the motor-wheels already described. $C^2$ is a coupling-sleeve which unites and securely holds the adjacent ends of the axles or field-carriers of both wheels. This coupling $C^2$ is provided with one or two rigid arms $D^2$, one of which is shown in section in Fig. 2, and in Fig. 3 both arms are shown in side elevation. $E^2$ $E^2$ represent screws or other means of fastening the axle or field-carrier Q rigidly to the coupling $C^2$. E E are the bearing-boxes of the motor-wheels. $G^2$ $G^2$ are the housings or pedestals of the bearing-boxes. $H^2$ $H^2$ are the beams of the truck. $I^2$ is the equalizer-bar. $J^2$ is the spring between the equalizer-bar and the truck. $K^2$ and $L^2$ are springs fastened each on one end of the arms $D^2$ $D^2$ and fastened at the top to the beam of the truck. V and X are the conductors conveying the electric current to the motors, which conductor-wires emerge through an opening of the coupling $C^2$. Now with this construction it will be seen that when the torque or strain comes upon the field-magnets the latter, although practically held stationary, nevertheless yields slightly with an elastic effect by virtue of the slight rocking of the axles Q and attached arms $D^2$ working against the springs $K^2$ $L^2$.

Having thus described our invention, what we claim as new, and desire to secure by Letters Patent, is—

1. An electric traction-motor having its casing constructed as a car-wheel of two side plates, said plates being formed with peripheral flanges connected together with a joint opening on the outer periphery, and a tire arranged outside of and covering said joint substantially as described.

2. An electric traction-motor having its casing constructed as a car-wheel of two side plates, said plates being formed with peripheral flanges having shoulders on the outer periphery, and a tire located between said shoulders and covering the joint between the peripheral flanges substantially as described.

3. An electric traction-motor having its case constructed as a car-wheel, an armature connected to and rotating therewith, a central axle and a centrally-arranged field-magnet mounted on the said axle, and roller-bearings arranged between the said axle and the rotating car-wheel substantially as described.

4. An electric traction-motor having its case constructed as a car-wheel with inwardly-projecting hub-flanges, an armature connected to the periphery of the wheel and rotating therewith, a central axle and centrally-arranged field-magnet mounted thereon, and roller-bearings arranged between the axle and the inwardly-projecting hub-flanges of the wheel substantially as described.

5. An electric traction-motor having its case constructed as a car-wheel with inwardly-projecting hub-flanges, an armature connected to the periphery of the wheel and rotating therewith, a central axle with field-magnet mounted thereon, a commutator-shell with commutator-plates mounted on the outer periphery of one of the inwardly-projecting hub-flanges, and roller-bearings arranged between said hub-flanges and the axle substantially as and for the purpose described.

6. An electric traction-motor having its case constructed as a car-wheel with an outwardly-projecting hub on each side, and an independent bearing-box on each side upon said hub, said hub and the bearings of the boxes being connected together against end thrust by interlocking grooves and collars substantially as described.

7. An electric traction-motor having its case constructed as a car-wheel bearing an armature on the inside, and having a central field-magnet and an axle rigidly attached thereto, said axle having outside of the motor-case springs for cushioning the torque substantially as described.

8. An electric traction-motor having its case constructed as a car-wheel bearing an armature on the inside and having a central field-magnet, combined with an axle fixed to the field-magnet and having one or more rigid arms and one or more springs interposed between said arm or arms and a stationary member of the truck substantially as described.

9. The combination of two car-wheels constructed as electric motors with fixed central field-magnets, independent axles rigidly secured to said field-magnets and alined with and approaching each other in the middle, a rigid coupling connecting the two adjacent ends of said axles said coupling having one or more arms and one or more springs connecting said arm or arms to a stationary member of the car-truck substantially as and for the purpose described.

10. An electric traction-motor having its case constructed as a car-wheel bearing an armature on the inside, a central field-magnet and axle rigidly attached thereto, said field-magnet being provided with a slight yielding motion against an elastic resistance to cushion the torque and avoid the jerk in starting the car-wheel to rotating substantially as described.

CHARLES RICHTER.
RICHARD T. ESCHLER.

Witnesses:
 EMIL SCHOTT,
 LAWRENCE VERGA.